United States Patent
Aydelott

[19]

[11] Patent Number: 5,832,914
[45] Date of Patent: Nov. 10, 1998

[54] INGOT TRIMMING METHOD AND APPARATUS

[75] Inventor: Richard M. Aydelott, Ridgefield, Wash.

[73] Assignee: SEH America, Inc., Vancouver, Wash.

[21] Appl. No.: 916,866

[22] Filed: Aug. 22, 1997

[51] Int. Cl.$^6$ .................................................. B28D 1/04
[52] U.S. Cl. .................................. 125/13.02; 125/11.06; 83/522.19; 83/421; 33/562; 33/628
[58] Field of Search .......................... 125/13.02, 11.06; 83/522.15, 522.16, 522.19, 469, 471, 468.7; 33/562, 566, 483, 529, 628, 630, 613

[56] References Cited

U.S. PATENT DOCUMENTS

| 509,764 | 11/1893 | Preece | 83/468.7 |
|---|---|---|---|
| 2,852,049 | 9/1958 | Peterson | 83/468.7 |
| 5,025,593 | 6/1991 | Kawaguchi et al. | 125/13.01 |
| 5,226,403 | 7/1993 | Toyama | 125/13.02 |
| 5,413,521 | 5/1995 | Terashima et al. | |

FOREIGN PATENT DOCUMENTS

| 0 229 687 B1 | 3/1994 | European Pat. Off. | |
|---|---|---|---|
| 14001 | 1/1983 | Japan | 33/483 |

*Primary Examiner*—Robert A. Rose
*Assistant Examiner*—George Nguyen
*Attorney, Agent, or Firm*—Kolisch, Hartwell, Dickinson, McCormack & Heuser

[57] ABSTRACT

An apparatus for cutting a semiconductor ingot utilizing an inner-diameter saw. The apparatus includes a reference structure positioned on the saw at a predetermined distance from the saw blade and a template having a cut positioning portion and a reference portion separated from the cut positioning portion by a distance corresponding to the predetermined distance. The template is adapted to be placed on the ingot with the cut positioning portion disposed adjacent the desired cut location so that the reference portion establishes a reference position on the ingot. The saw is adapted thereby to cut the ingot at the desired location when the reference position on the ingot is aligned with the reference structure on the saw.

7 Claims, 2 Drawing Sheets

INGOT TRIMMING METHOD AND APPARATUS

TECHNICAL FIELD

The present invention relates to manufacturing semiconductor wafers and more particularly to a method and apparatus for accurately trimming the ends of a rough semiconductor ingot in the course of processing the ingot into wafers.

BACKGROUND ART

Semiconductor wafers form the foundation for virtually all integrated circuits and other semiconductor devices. These wafers are cut from single crystal, generally cylindrical ingots that are grown to a predetermined diameter and length. Most commonly these ingots are formed of silicon. Because of the nature of the crystal growth process, the diameter and length of the ingot cannot be precisely controlled. Moreover, the growth process also creates an ingot with conical ends which must be trimmed off in the course of processing the ingot.

Growing and processing semiconductor ingots is a very time-consuming and expensive process. It is therefore essential to maximize the number of wafers that can be obtained from each ingot. One factor important to ensuring that the optimal number of wafers are obtained from each ingot is trimming the conical ends at the proper location so that none of the cylindrical section is removed. Because each cut on the ingot is time consuming, it is also important not to trim too little of the conical portion to thereby avoid the need for a second cut to reach the correct length.

The conical ends of ingots are typically trimmed off utilizing an inner-diameter circular saw. This type of saw utilizes a very thin annular blade that is driven from the outer perimeter and cuts with the inside edge of a central opening of the blade. This type of saw can be made with a very thin blade—on the order of 200–400 micrometers ($\mu$m). A shroud surrounds the blade to contain any shrapnel in the event of a blade failure.

One problem created by use of an inside diameter saw is the difficulty of targeting the cut at the proper position along the ingot. Although it is possible to visually align the saw with the desired cut location, this method is inherently not very accurate. In particular, the blade, shroud and drive mechanism completely surround the ingot in the area to be cut and the operator must therefore align the cut from an oblique angle. With the blade often being several inches away from the ingot, it is difficult for the operator to visually align the blade at the proper location.

In another system, illustrated in FIG. 1, a laser 10' is used to align the ingot 12' for cutting. The laser is mounted to a shroud 16' around the blade 18' and the laser beam 14' bounces off an alignment mirror 20' onto the ingot. By adjusting the alignment mirror the laser spot can be positioned directly under saw blade 18'. However, because the laser beam approaches the surface of the ingot at an angle, the location of the laser spot varies with the diameter of the ingot, as illustrated by the dotted lines in FIG. 1. Therefore, the mirror must be adjusted for a specific ingot diameter. However, since the diameter of the ingots varies, use of a laser system set for specific diameter ingot leaves a residual inaccuracy when used on ingots of varying diameter. In addition, it is very easy to bump the mirror and inadvertently destroy the initial alignment. Another disadvantage of the laser alignment system is the expense of the laser and mirror. Moreover, the laser can create a risk of eye damage to operators accidentally exposed to the beam.

It is therefore an object of the present invention to provide a method and apparatus for accurately and reliably trimming the conical ends from raw ingots.

It is an additional object of the present invention to provide such a method and apparatus that operates substantially independent of diameter variations among ingots.

One more object is to provide such a method and apparatus that is economical and easy to use.

These and other objects of the present invention will become apparent from study of the following description of the present invention in which a preferred embodiment is illustrated.

SUMMARY OF THE INVENTION

The present invention includes a method and apparatus for cutting a semiconductor ingot utilizing an inner-diameter saw. The apparatus includes a reference structure positioned on the saw at a predetermined distance from the saw blade and a template having a cut positioning portion and a reference portion separated from the cut positioning portion by a distance corresponding to the predetermined distance. The template is adapted to be placed on the ingot with the cut positioning portion disposed adjacent the desired cut location so that the reference portion establishes a reference position on the ingot. The saw is adapted thereby to cut the ingot at the desired location when the reference position on the ingot is aligned with the reference structure on the saw.

The method involves locating a reference structure on the saw at a predetermined distance from the saw blade and placing a template on the ingot with the template having a cut positioning portion and a reference portion separated from the cut positioning portion by a distance corresponding to the predetermined distance. The template is adjusted on the ingot so that the cut positioning portion is disposed adjacent the desired cut location, the template thereby locating the reference portion at a reference position on the ingot. The ingot is then positioned in the saw so that the reference structure is aligned with the reference position on the ingot and cut.

DETAILED DESCRIPTION OF THE PREFERRED EMBODIMENT AND BEST MODE OF CARRYING OUT THE INVENTION

Figure 1:
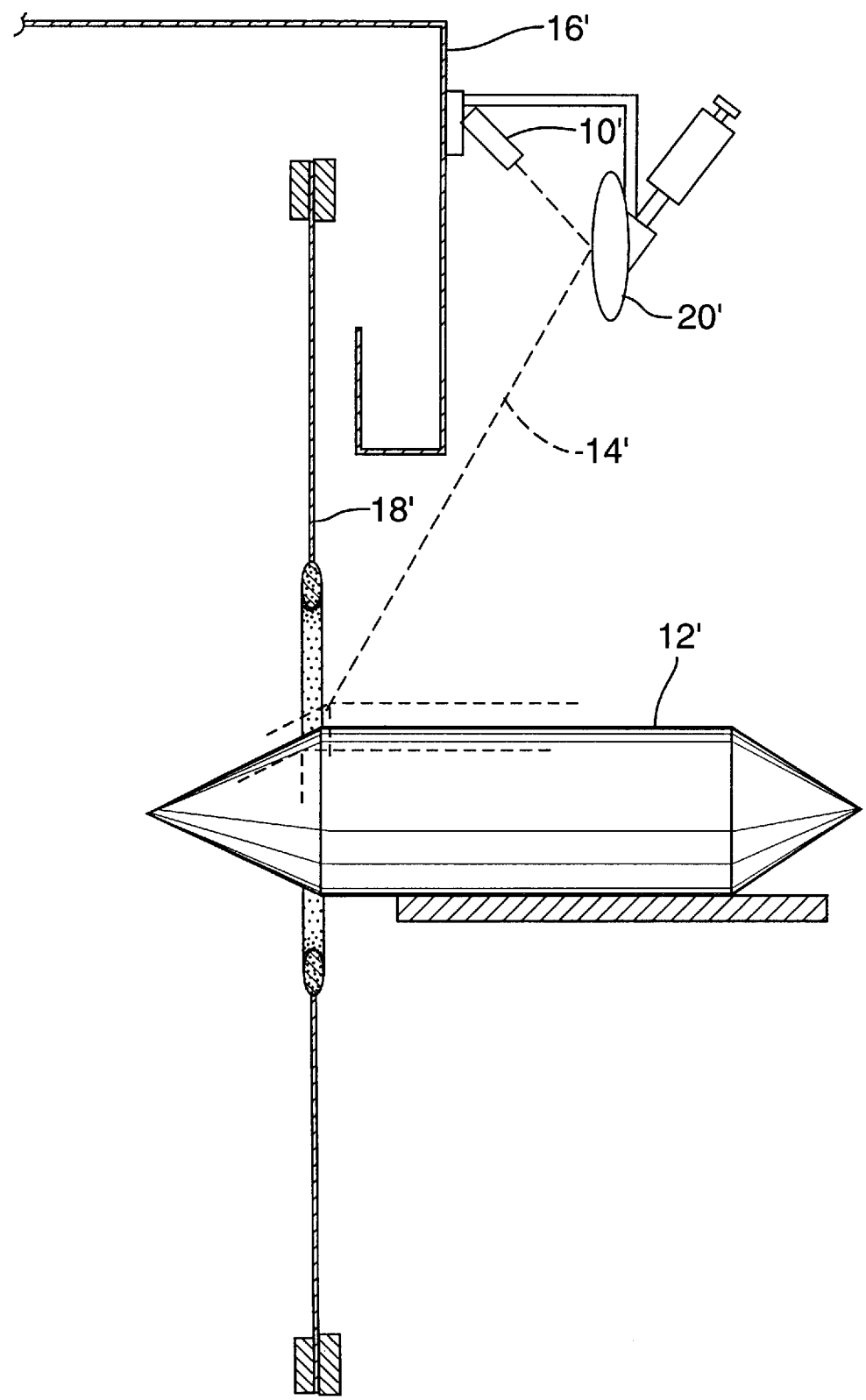
FIG. 1 illustrates a prior art apparatus for aligning cuts on an ingot.
Figure 2:
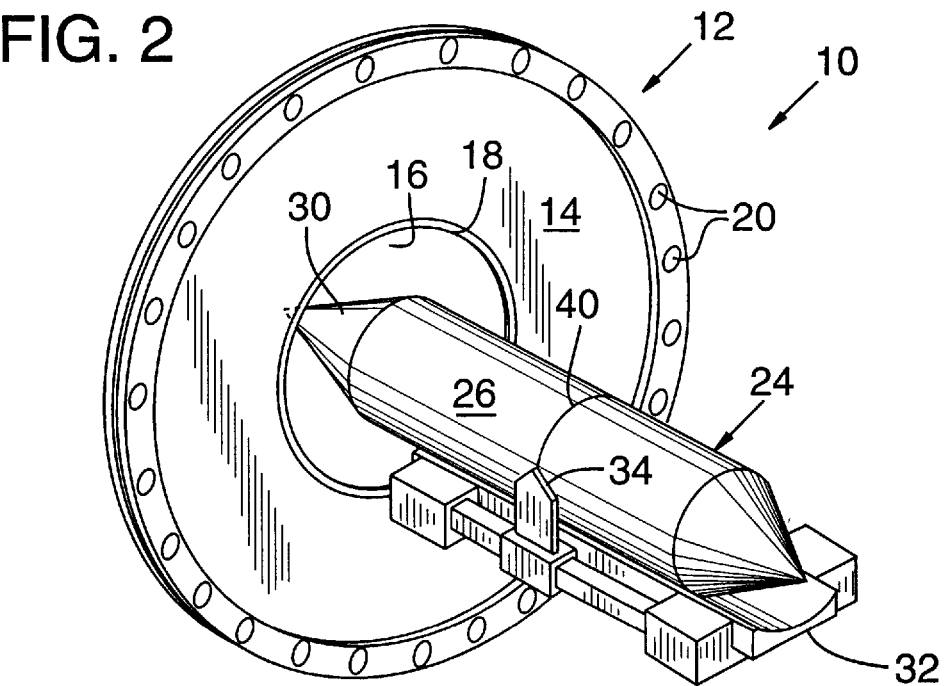
FIG. 2 shows an apparatus for trimming semiconductor ingots according to the present invention.

An apparatus for trimming semiconductor ingots according to the present invention is shown generally at 10 in FIG. 2. Apparatus 10 includes an inner-diameter saw 12 which utilizes an annular saw blade 14. Saw blade 14 includes a central opening 16 with a cutting edge 18. The saw blade is attached to the drive portion of the saw (not shown) by a plurality of holes 20 disposed around the outer perimeter of the saw blade. A shroud (not shown) surrounds the saw blade and drive portion of the saw. Generally the blade will have a thickness of about 200 $\mu$m with diamond cutting edge having a thickness of about 400 $\mu$m.

Saw 12 is adapted to cut or trim an ingot 24 having a cylindrical central portion 26 and a pair of opposed conical ends 28, 30. The saw includes a carriage 32 adapted to support the ingot during cutting. The carriage can be moved toward and away from the blade to adjust the position of the cut. Reference structure in the form of a pointer 34 is provided adjacent carriage 32 for use in properly positioning the ingot for cutting, as will be described below. The pointer is positioned at a predetermined distance from the saw blade. In the preferred embodiment, this distance in approximately six inches.

Figure 3:
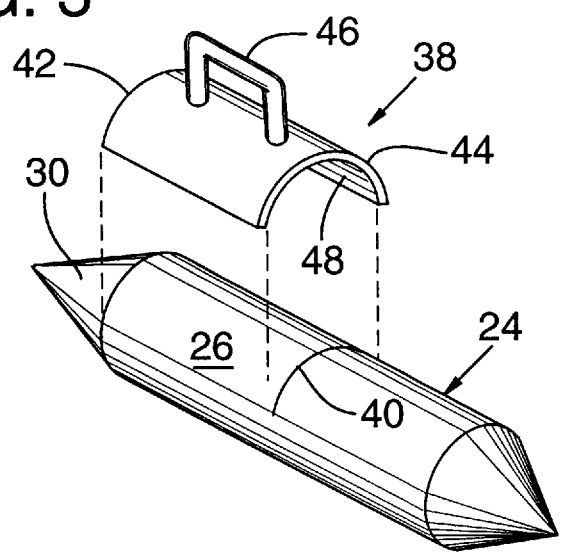
FIG. 3 shows a jig for use with the apparatus of FIG. 2.

As shown in FIG. 3, apparatus 10 also includes a template or jig 38 for use in establishing a reference position 40 on the ingot. Jig 38 includes a cut positioning portion in the form of forward edge 42, and a reference portion in the form of rear edge 44. The distance between edges 42 and 44 corresponds to the predetermined distance between the saw blade and the pointer. A handle 46 allows the operator to easily move and position the jig. The jig is preferably curved as illustrated with a concave lower surface 48 shaped to conform to the outside curvature of the ingot. Because ingots come in different standard sizes, i.e., 4, 5, 6 inch, the apparatus may includes multiple jigs curved to correspond to the various standard sizes. It may also be desirable to make the jig slightly flexible in curvature to conform to the slight variations that naturally occur in ingots of the same standard size.

To cut an ingot according to the present invention the operator of the saw places the jig on the ingot. The jig may be applied either before or after the ingot is loaded on the carriage. The forward edge is aligned on the ingot adjacent the juncture between a conical end and the central portion at the desired location for the cut. Once the jig is positioned, the operator marks the ingot along rear edge 44 to establish reference position 40. The ingot then adjusted with the carriage to align the reference position with the pointer. The ingot is thereby properly positioned so that the saw blade will accurately cut the ingot at the desired location.

It should be noted that the operation of the present invention is not affected by fluctuations in the diameter of the ingot. Nor is the operator required to estimate or guess at the proper position of the ingot relative to the saw blade. Operation of the present invention also requires little training or experience, virtually no maintenance and does not involve any significant expense. The present invention therefore improves the accuracy and reliability of cutting the ingot at the proper location to maximize wafer production.

INDUSTRIAL APPLICABILITY

The present invention is useful in the manufacture and processing of semiconductor ingots and provides advantages of maximizing utilization of raw material in a simple, economical and reliable fashion.

It will now be clear that an improvement in this art has been provided which accomplishes the objectives set forth above. While the preferred embodiments of the invention have been set forth and described above, these embodiments should not be considered as limiting the scope of the invention. Rather, the scope of the invention should be determined by the language of the following claims and their legal equivalents.

I claim:

1. A method of cutting a semiconductor ingot at a desired cut location, the method comprising:

providing an inner-diameter saw having a saw blade capable of cutting the ingot;

locating a reference structure on the saw at a predetermined distance from the saw blade;

placing a template on the ingot, the template having a cut positioning portion and a reference portion separated from the cut positioning portion by a distance corresponding to the predetermined distance;

adjusting the template on the ingot so that the cut positioning portion is disposed adjacent the desired cut location, the template thereby locating the reference portion at a reference position on the ingot;

positioning the ingot in the saw so that the reference structure is aligned with the reference position on the ingot; and cutting the ingot with the saw blade with the reference structure aligned with the reference position on the ingot so that the saw blade cuts the ingot at the desired cut location.

2. The method of claim 1, further including marking the ingot at the reference position after the step of adjusting.

3. An apparatus for cutting a semiconductor ingot at a desired cut location, the apparatus comprising:

an inner-diameter saw equipped with a saw blade;

a reference structure positioned on the saw at a predetermined distance from the saw blade;

a template having a cut positioning portion and a reference portion separated from the cut positioning portion by a distance corresponding to the predetermined distance, where the template is adapted to be placed on the ingot with the cut positioning portion disposed adjacent the desired cut location so that the reference portion establishes a reference position on the ingot, the saw being adapted thereby to cut the ingot at the desired location when the reference position on the ingot is aligned with the reference structure on the saw.

4. The apparatus of claim 3, wherein the template has a generally concave lower surface curved to match the shape of the ingot.

5. The apparatus of claim 3, wherein the cut positioning portion takes the form of a front edge of the template.

6. The apparatus of claim 3, wherein the reference portion takes the form of a rear edge of the template.

7. The apparatus of claim 3, wherein the template includes a handle configured to allow an operator to move and position the template.

\* \* \* \* \*